July 28, 1964

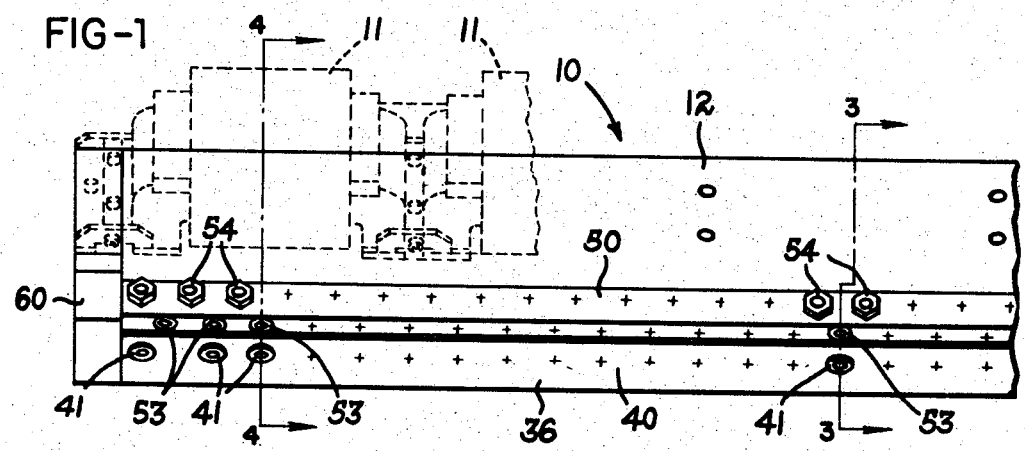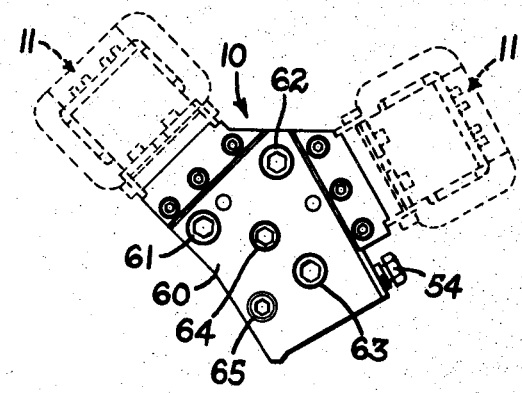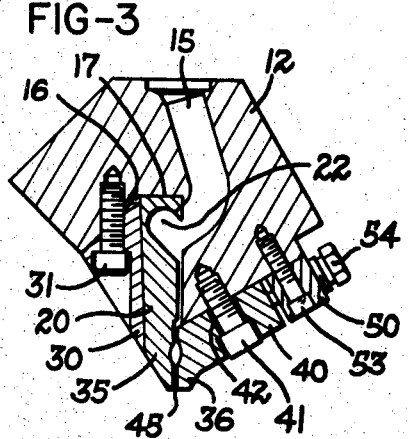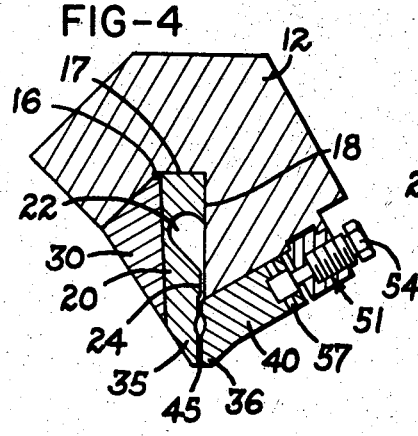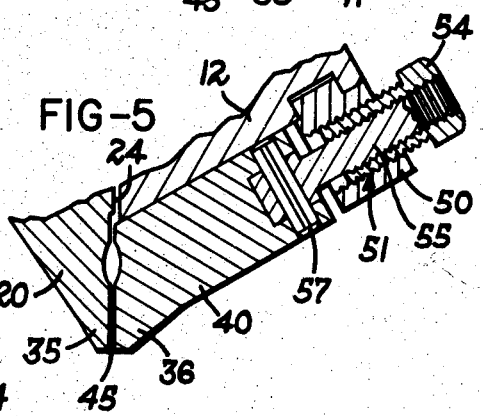

R. E. HOFFMAN ETAL 3,142,090

EXTRUDERS

Filed July 26, 1961

*INVENTORS*
ROBERT B. HOFFMAN,
BY LLOYD B. SPONAUGLE &
ARTHUR D. STEVENS

*ATTORNEYS*

United States Patent Office 3,142,090
Patented July 28, 1964

3,142,090
EXTRUDERS
Robert E. Hoffman and Lloyd B. Sponaugle, Akron, and Arthur D. Stevens, Cuyahoga Falls, Ohio, assignors to The Black-Clawson Company, Hamilton, Ohio, a corporation of Ohio
Filed July 26, 1961, Ser. No. 126,994
5 Claims. (Cl. 18—12)

This invention relates to plastic extruders and more particularly to an extended film die for high temperature and/or pressure operation for extruding flat plastic films, coatings and the like. The problem of extruding extended plastic films is made more difficult by the increasingly high temperatures and pressures which are becoming characteristic of the extruding conditions for certain plastic materials. Such extruding pressures may run as high as 5,000 p.s.i. as measured within the die neck or inlet and the temperatures may run up to 800° F., and it is now common to run a steady 625° F. temperature and 2,000 p.s.i. It has been difficult to provide extended dies which operate at such temperatures and pressures without the leaking and oozing of the liquid plastic at points and joints about the die other than through the extrusion nozzle.

Certain extended film dies which have been designed to withstand such operating conditions and be substantially free of leaks are difficult to clean. Such cleaning is a necessary periodic function, and since it requires the physical handling of the parts of the die, it may be accomplished only after the die has cooled down.

The die of this invention has eliminated many of the difficulties which have characterized the designs of the prior art, and combines features of simplicity and construction, an ability to operate at high extrusion pressures and temperatures without leaking while maintaining an orifice of uniform dimension, together with ease of disassembly and maintenance for cleaning purposes.

The principal die member consists of a solid body which is arranged to support a fixed die member and a movable die member. The fixed die member is preferably removably held and locked within a recess formed within the die body. The locking member for this purpose may consist of a wedge which is secured to the die body against the fixed die member, and provides for control of the sealing force of the fixed member within the recess of the body to eliminate the leaking or oozing of plastic material past the fixed die member. An extrusion cavity or manifold is formed within one side of this fixed die member so that it is open at one side to permit ease of cleaning. This manifold portion of the fixed die member is held with considerable force against a cooperating surface or plane formed by the recess in the body and defines a closed cavity through which the plastic material flows to the extrusion orifice.

A movable die member is also supported on the body and cooperates with the fixed die member to form a pair of die lips defining an elongated extruding orifice. The movable die member is held in sealing contact with an outside surface of the body and includes provision for the minute adjustment of the spaced apart distance of the lips which define the extruding orifice.

The width of extrusion from flat film dies is commonly controlled by devices known as deckle rods which are variously contrived to block off a portion of the extruding orifice at one or both ends of the die for the purpose of controlling the width of extrusion. However, such deckle devices are not desired or required where the die is intended to operate over a given width for a reasonable period of time. This invention provides for the change in the width of the extrusion from a given die body by the substitution of the die members with another set of die members specifically designed to provide a different width of extrusion. Several fixed extrusion widths may be readily provided by the replacement of a few removable parts of the die, and the troublesome leaking at the usual deckle devices is eliminated.

An object of this invention is the provision of a die for plastic extruders characterized by simplicity of construction and ease of cleaning, as outlined above.

A further object of this invention is the provision of a flat film die which is particularly suited for high pressure and high temperature operation without leaking and which preferably includes a unitary body to contain and retain one of the die lip members.

A further object of this invention is the provision of a flat film die having a solid die body and a lip removably received within a recess formed within the body, which lip includes an open passageway formed therein for the distribution of plastic material to an extruding nozzle characterized by ease of cleaning by access through the open side thereof.

A still further object of the invention is the provision of a flat film die adapted for the extrusion of varying widths of film material by the substitution of the removable die lips.

Another object of this invention is the provision of a flat film die wherein a removable die member is held within a cavity formed within a die body by a wedge bar and which extends therefrom to form an extrusion lip for cooperation with a movable die lip secured in abutting relation to the body.

Other objects and advantages of the invention will be apparent from the following description, the accompanying drawings and the appended claims.

In the drawings—

FIG. 1 is a side elevation of a portion of a die constructed according to this invention;

FIG. 2 is a left-hand end view of the die of FIG. 1;

FIG. 3 is a central vertical section taken generally along the line 3—3 of FIG. 1;

FIG. 4 is a section of the die taken adjacent an end thereof, generally along the line 4—4 of FIG. 1;

FIG. 5 is an enlarged detail of a portion of FIG. 4 showing the arrangement for adjusting the movable lip;

Figure 8:
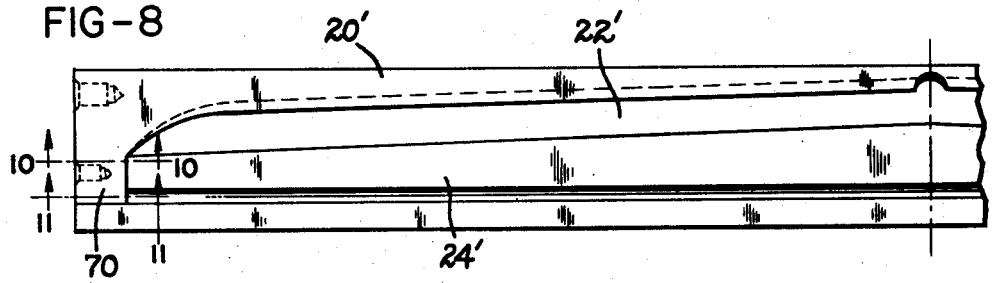
FIG. 8 is a view similar to that of FIG. 6 but showing a fixed die member adapted for the extruding of a film less than the full width of the member of FIGS. 6 and 7.
Figure 9:
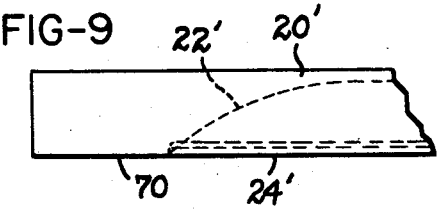
FIG. 9 is a top view of the left-hand end of the die of FIG. 8.
Figure 10:
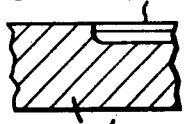
Figure 11:
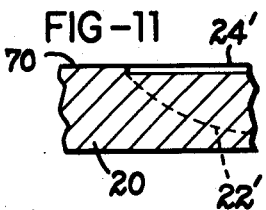
Figure 12:
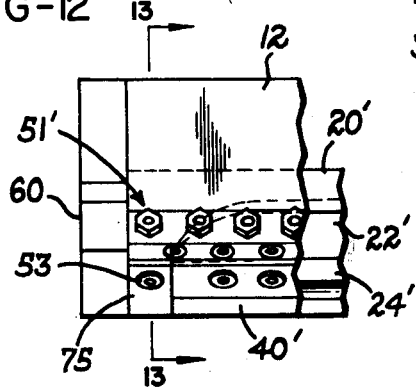
Figure 13:
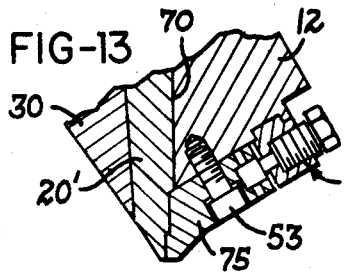

FIGS. 10 and 11 are respectively fragmentary sections taken along the lines 10—10 and 11—11 of FIG. 8 showing the details of the extruding orifice, distribution manifold cavity, and the sealing land portion of this die member;

FIG. 12 shows the left-hand end portion of the die of FIG. 1 when used for the extrusion of films of lesser width showing the installation of one of the spacer blocks; and FIG. 13 is a transverse section taken generally along the line 13—13 of the die of FIG. 12 showing the arrangement of the spacer blocks with the fixed die member of FIGS. 8–11.

Referring to the drawings, which illustrate a preferred embodiment of this invention, a top-entry, vertical discharge, flat film die constructed according to this invention is shown generally at 10 in FIGS. 1 and 2. The die 10 is preferably heated by means of induction heating units 11 which are shown in broken outline form and which form no part of the present invention. Such heating units may preferably be constructed according to the teachings of the copending application of Schroyer et al., Serial Number 127,052, filed concurrently herewith.

The principal die member consists of a one-piece die body 12 which forms the main supporting structure for the remainder of the die components. The body 12 includes a plastic inlet conduit 15 formed centrally thereof which communicates with a longitudinally extending cavity or recess 16 formed somewhat asymetrically or offset within the body. The exterior surface of the body 12 forms a four sided trapezium when viewed from the ends as shown in FIGS. 3 and 4, and the recess 16 which is formed in one of the sloping lower sides includes intersecting horizontal and vertical plane surfaces which are accurately machined and form parting plane surfaces 17 and 18.

Figure 6:
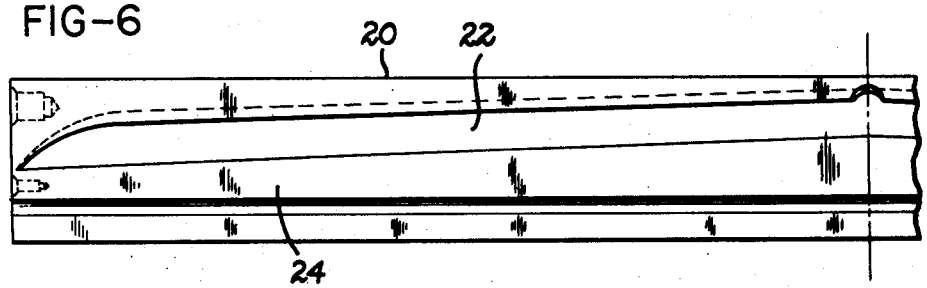
FIG. 6 is a side view of the fixed die member for extruding a full width of plastic film.
Figure 7:
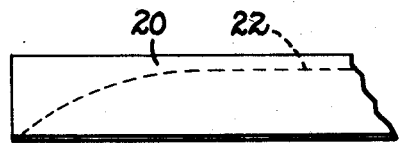
FIG. 7 is a top plan view of the left-hand end of the die member of FIG. 6.

A fixed die member 20 has outer surfaces which are proportioned to be received in the recess 16 and forms a sealing fit against the parting planes 17 and 18. As shown in FIGS. 3 and 4, this die member is substantially rectangular in section but is preferably formed with a slight taper so that it is wider at the top than at the bottom. The die member 20 is formed with an extrusion cavity or manifold 22 formed entirely within one side thereof adjacent the vertical parting plane 18, and is somewhat tear-dropped in section being deeper at the top and tapering outwardly at the bottom. The manifold cavity 22 is formed with a "coat hanger" drape in that it extends from a point adjacent the top of the member 20 centrally thereof and slopes downwardly toward the ends of the member and terminates at each opposite end at a tapered point, as indicated in FIGS. 6 and 7. The die member thus forms a pre-land portion 24 adjacent the plane 18 which varies from a maximum at the center as shown in FIG. 3 to a minimum at the ends of the die, as illustrated in FIG. 4, thereby tending to equalize the rate of extrusion from the manifold 22.

Means removably holding the member 20 within place in sealing relation to the recess 16 includes a generally triangular wedge bar 30 which has one side in abutment with the back side of the die member 20 and a sloping side in abutment with the body 12 at the recess 16. The wedge bar 30 is held or secured by a plurality of bolts 31, which may be tightened, as desired, to assure the retention and sealing of the member 20 at the parting planes 17 and 18 of the body 12.

A lower portion of the die member 20 extends from the pre-land 24 below the bottom of the die body 12 to form an extrusion lip 35. The lip 35 cooperates with the lip 36 of a movable die member 40 mounted by bolts 41 on an angular outside or exposed surface of the body 12. The movable member 40 is adjustable along the surface of the body 12 by means of a clearance space 42 which is provided around each of the bolts 41 so that the width of the extrusion orifice 45 defined between the lips 35 and 36 may be controlled. The orifice 45 communicates with the manifold 22 through the clearance space provided between the pre-land 24 of the member 20 and the parting plane 18 of the body 12.

Means for accurately positioning the member 40 with respect to the member 20 includes a bar 50 which supports a plurality of differential adjusting mechanisms 51. The bar 50 is keyed and held in position on the body 12 by a plurality of retaining bolts 53 distributed between the mechanisms 51 and extending into the body 12. The differential adjustment mechanisms 51 each include an outer cap screw 54 with external and internal threads. A link bolt 55 is received within the screw 54 in engagement with the internal threads, and carries a roll pin 57 on the inner end thereof in engagement with the member 40. The internal and external threads are of differing pitches resulting in the reduced travel of the link bolt 55 as compared to the rate of travel of the screw 54 in the bar 50, thereby providing accurate adjustment of the position of the member 40 along the length of the body 12.

The open or exposed opposite ends of the body 12 are closed by a pair of end caps 60 which form an abutting sealing fit against the planar end surface of the body 12 and the planar end surfaces of the die members 20 and 40, the wedge bar 30, and the bar 50. The end caps 60 are secured by three bolts 61–63 which extend into the body and a pair of bolts 64 and 65 which extend into the fixed die member 20.

The invention includes provision for the extruding of films of reduced width as compared to the total width of the die, by the substitution of the die members 20 and 40 with die members illustrated in FIGS. 7–13 and by the employment of a pair of spacer blocks to seal the fixed die members at land portions on the ends thereof. The movable die member 40′ which is employed for narrower extrusion is, in many respects, identical with the member 40 described above with the single exception that it is of a shorter length. Accordingly, this is shown in FIG. 12 as the die member 40′ which does not extend to the end of the body 12 as in the case described above, but terminates short of the length of the body according to the width of film desired to be extruded.

The fixed die member 20′ which is used in lieu of the member 20 is of slightly different construction and is shown in FIGS. 8–11 as having a manifold cavity 22′ which terminates a distance short of the total length of the member 20′ according to the width of film to be extruded. The pre-land 24′ is similarly terminated. As is perhaps best shown in FIGS. 9–11, the space defined between the terminal end of the manifold 22′ and the pre-land 24′, and the end of the fixed die member forms a land area 70 which has a width corresponding to the decrease in width of the web to be extruded as compared to the full width shown in the preceding figures. The width of the manifold cavity 22′ and pre-land 24′ corresponds to the effect of length of the movable die member 40′.

The remaining total length of the fixed member 20′ is occupied by a pair of spacer blocks 75, one positioned at each end of the member 40′, and precisely fitted between the abutting end of the member 40′ and the inside surface of the end plate 60 to form a seal therewith. The spacer blocks 75 are each held by one of the bolts 53 and is operated by one of the adjusting mechanisms 51 to form a tight, leak-proof sealing fit with the extension comprising the lip portion of the fixed die member 20′.

In the operation of this invention, plastic material in liquid form may be applied to the inlet 15 of the body 12 under suitable extruding pressures and temperatures, such as may be supplied by an extruding press of the screw type. Preferably, the operating temperature of the body 12 is maintained by means of suitable external heating elements 11 as described in the above-mentioned copending application of Schroyer et al. The inlet 15 communicates directly with the central portion of the manifold cavity 22 with the resulting distribution of the liquid plastic to the ends of the fixed die member 20. The varying depth of the pre-land portions 24 according to the coat hanger drape of the manifold 22 assures equal distribution of the liquid material to the orifice 45.

The recess 16 formed within the die 12 cooperates with the adjacent surface of the manifold cavity 22 to form a closed manifold for the distribution of plastic material. The wedge bar 30 assures intimate metal-to-metal contact at the parting plane surfaces 17 and 18 to prevent the leaking of plastic around or behind the fixed die member 20.

The arrangement of the invention including the fixed die member 20 which is received substantially wholly within the cavity 16 and including an external lip portion 35 cooperating with an externally mounted die member 40 results in the containment or confinement of most of the high pressures within the body 12. Thus, the single piece body is provided to contain these pressures, but is readily cleanable, when required, by the removal of the wedge bar 30, thereby permitting the removal of the fixed die member 20. This has the effect of removing the manifold distribution cavity from within the die member 12 where it may be readily cleaned. Also, the inlet 15 is now accessible for cleaning both from the top and from the bottom with the die member 20 removed.

When it is desired to extrude in a width less than the total width provided by the length of the die, the members 20 and 40 may be removed and members 20' and 40' substituted therefor. In addition, the spacer blocks 75 are positioned at each opposite end of the movable die member 40' to fill out the space to the inside surface of the end caps 60. The land portions 70 formed at each end of the members 20 cooperate with the parting plane surface 18 of the body 12 to form a metal-to-metal seal thus limiting the width of extrusion. In addition, the spacer blocks 75 include a step face which cooperates with the adjacent face of the member 20 to provide a fluid-tight seal.

It is therefore seen that this invention provides a flat film die which is readily cleaned and which is readily adapted to the extrusion of differing fixed widths of film by the replacement of the die members. The distribution manifold is removed for cleaning with the removal of the fixed die member and is open on one side along its length so that the plastic material may be removed therefrom with the member 20 placed upon a bench or other suitable holding device without danger of damaging the die surfaces.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A flat film extrusion die comprising a one piece body having means defining a plastic inlet passageway and a longitudinally extending recess communicating with said passageway, a fixed die member, a wedge bar between said fixed die member and said die body securing said fixed die member in sealing relation in said recess, means in said fixed die member defining a manifold cavity formed in one side thereof positioned adjacent a cooperating surface portion of said body to form a plastic manifold defined wholly between said fixed die member and said body, said fixed die member extending from said manifold and terminating at a lip externally of said body and defining with said body an elongated extrusion passageway leading from said manifold to said lip, a movable die member, means mounting said movable die member on said body, said movable die member having a die lip portion cooperating with the said lip of said fixed die member defining an elongated extrusion orifice communicating with said extrusion passageway.

2. An extended film die for extruding hot plastic material under high extruding pressures comprising a one piece die body, means in said die body defining a longitudinally extending recess, a fixed die member received in said recess and having means in one side thereof forming an extrusion manifold wholly in said one side extended substantially along the length thereof and having an extrusion lip extending therefrom, a planar wall portion of the die body at said recess cooperating with said manifold to form a closed extrusion passageway leading from said manifold to said lip, wedge means between said fixed die member and said die body removably retaining said fixed die member in said recess in sealing engagement with said wall portion, and a movable die member mounted on said body and having a lip portion forming an elongated extrusion orifice with the said lip of said fixed die member in communication with said passageway, and second die lip retaining means separately retaining said movable die member in sealing engagement with said body.

3. A flat film plastic extrusion die comprising, a one piece body having means defining a plastic inlet passageway and a longitudinally extending recess opening into said passageway and having a parting plane formed on one inside surface thereof, a fixed die member proportioned to form a sealing fit with said body at said recess parting plane and having a manifold cavity formed in one face thereof, a wedge bar received in said recess between said fixed die member and said die body securing said fixed die member within said recess in sealing relation at said parting plane with said manifold cavity being closed on the open side thereof by said parting plane, said fixed die member having a die lip extending from said cavity and terminating externally of said body, and a movable die member mounted for limited movement on an outer surface of said body and having a lip portion positioned in cooperative relation adjacent the lip portion of said fixed die member defining an extrusion orifice, and means separate from said wedge bar securing said movable die member in sealing relation to said outer surface.

4. An extended film plastic extrusion die, comprising a body having means defining a plastic inlet passageway and a recess, a fixed die member proportioned to form a sealing fit with said body at said recess and having a manifold cavity formed therein open on one side thereof to receive plastic from said passageway, said body having wall means closing the open side of said cavity, means removably securing said fixed die member within said recess including a wedge bar proportioned to form a wedging fit in said recess between said body and said fixed die member including fastening means connected to said body for drawing said bar against said fixed member to force said member into intimate metal-to-metal sealing contact with said body within said recess, and a movable die member mounted on said body defining an adjustable extrusion orifice with said fixed die member, and means separate from said wedge bar retaining said movable die member in sealing contact with said body.

5. An extended film plastic extrusion die, comprising a body having means defining a plastic inlet passageway and a recess, a fixed die member proportioned to form a sealing fit with said body at said recess and having a manifold cavity formed therein open on one side thereof, said body in said recess having wall means including said passageway closing the open side of said cavity, means removably securing said fixed die member within said recess including a wedge bar substantially coextensive with said fixed die member and proportioned to form a wedging fit in said recess between said body and said fixed die member, fastening means extending through said bar into said body for drawing said bar against said fixed member to force said member into intimate metal-to-metal sealing contact with said body at said recess wall means, and a movable die lip member mounted on said body defining an extrusion orifice with said fixed die member.

References Cited in the file of this patent

UNITED STATES PATENTS

| | | |
|---|---|---|
| 2,204,151 | Rodefer et al. | June 11, 1940 |
| 2,387,718 | Coleman | Oct. 30, 1945 |
| 2,628,386 | Tornberg | Feb. 17, 1953 |
| 2,730,760 | Bibby | Jan. 17, 1956 |
| 2,859,475 | Tornberg | Nov. 11, 1958 |
| 2,998,624 | Ricketts | Sept. 5, 1961 |
| 3,000,054 | Seifried et al. | Sept. 19, 1961 |
| 3,003,245 | Nunez | Oct. 10, 1961 |
| 3,063,095 | Limback | Nov. 13, 1962 |

FOREIGN PATENTS

| | | |
|---|---|---|
| 551,760 | Belgium | Dec. 31, 1959 |

OTHER REFERENCES

Germany, K17,588/IVc/80a, Dec. 22, 1955.